Figure 1:
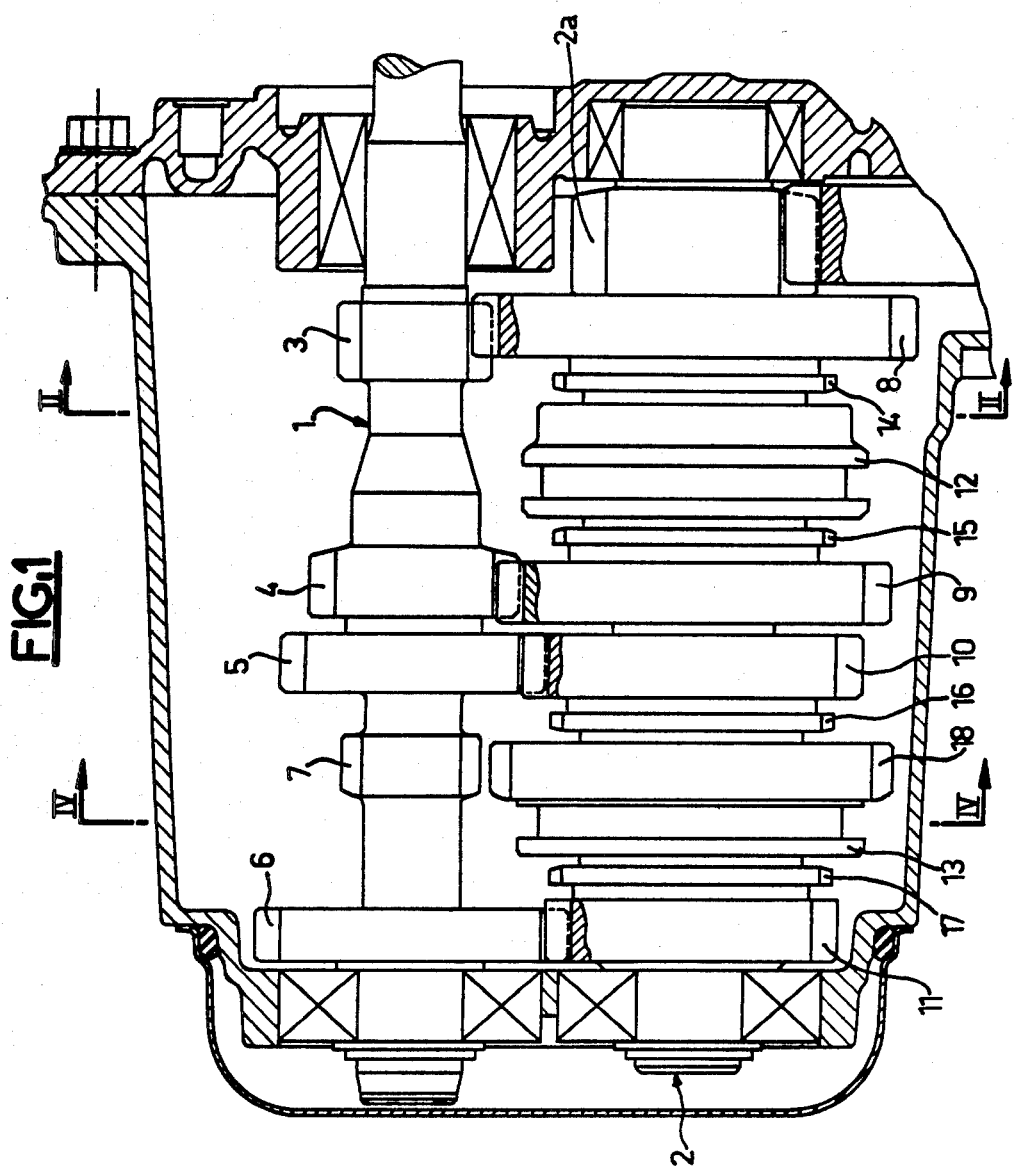

United States Patent [19]

Boutant

[11] Patent Number: 4,484,489
[45] Date of Patent: Nov. 27, 1984

[54] REVERSE DRIVE CONTROL DEVICE FOR VEHICLE GEARBOX

[75] Inventor: Jean-Jacques Boutant, Rueil-Malmaison, France

[73] Assignee: Regie Nationale des Usines Renault, Boulogne-Billancourt, France

[21] Appl. No.: 408,119

[22] Filed: Aug. 13, 1982

[30] Foreign Application Priority Data

Aug. 14, 1981 [FR] France ............... 81 15744

[51] Int. Cl.³ ............................................. G05G 9/12
[52] U.S. Cl. ..................................... 74/473 R; 74/477
[58] Field of Search ............................. 74/473 R, 477

[56] References Cited

U.S. PATENT DOCUMENTS

| 2,073,045 | 3/1937 | Bachman | 74/473 R |
| 2,425,204 | 8/1947 | Peterson et al. | 74/473 R |
| 2,800,033 | 7/1957 | Zittrell | 74/473 R |
| 2,931,243 | 4/1960 | Magg | 74/473 R |
| 3,053,102 | 9/1962 | Alfieri | 74/473 R X |
| 4,137,790 | 2/1979 | Hiraiwa | 74/473 R |

FOREIGN PATENT DOCUMENTS

| 25734 | 3/1981 | European Pat. Off. . |
| 540432 | 12/1931 | Fed. Rep. of Germany . |
| 994187 | 10/1951 | France . |
| 1232503 | 4/1960 | France . |
| 2295309 | 12/1975 | France . |
| 2062144 | 5/1981 | United Kingdom . |
| 2066909 | 7/1981 | United Kingdom ............. 74/473 R |

Primary Examiner—Allan D. Herrmann
Attorney, Agent, or Firm—Owen, Wickersham & Erickson

[57] ABSTRACT

The reverse drive gear wheel is mounted to be fixed in translation on its selector shaft (26). The gear ratio selector and engagement control element (20) comprises a peg (23) engaging directly with a notched yoke (31) fixed to the selector shaft (26). The peg is so designed that a reverse drive ratio engagement angular movement is roughly double that of another peg (22) used to operate the forward drive gear selector shafts.

1 Claim, 4 Drawing Figures

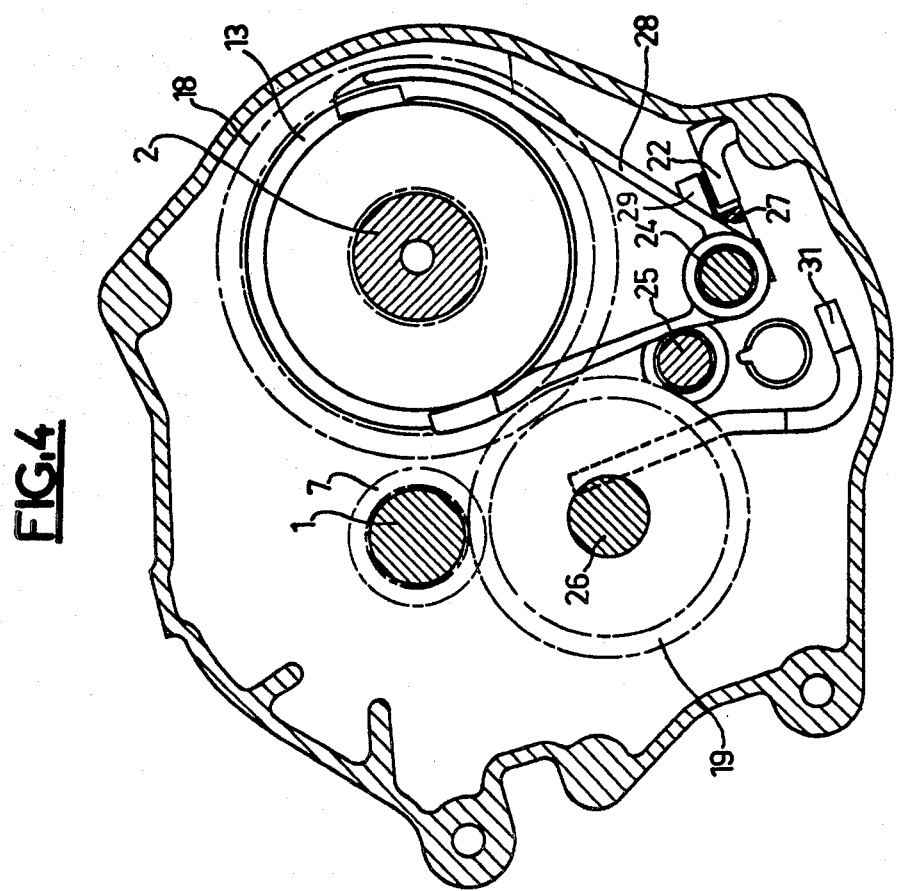

REVERSE DRIVE CONTROL DEVICE FOR VEHICLE GEARBOX

The invention relates to a device for controlling reverse drive for a vehicle gearbox with sliding ring(s), comprising a gear ratio selector and engagement element designed to engage selectively with forward and reverse gear selector shafts, with this element moving angularly to carry out engagement of the selected ratio.

The invention relates more especially to a gearbox in which the reverse drive is provided by means of a gear which can move in translation and is designed to be engaged, so as to bring reverse drive into gear, with a gear that is integral with a forward drive engagement sliding ring and with a gear that is integral with a gearbox shaft parallel to the sliding ring(s) shaft.

In this case the reverse control travel must include a forward drive travel and must be approximately twice the latter, which has led known solutions of this type to use a multiplying return lever positioned between the selector shaft and the movable reverse gear.

The object of the present invention is a simplified solution avoiding the use of such a multiplying return lever and cutting the cost and weight of the control.

Basically, for this purpose, the reverse drive control device according to the invention for a vehicle gearbox of the predefined type is characterized in that the said reverse drive gear is mounted to be fixed in translation on its selector shaft and in that the said selector and gear ratio engagement control comprises a peg working directly with a notched yoke fixed to the said reverse drive selector shaft, with this peg being shaped to provide the said angular reverse drive ratio engagement movement with an operating range which is roughly double the range of another peg of the said selection and control element used to operate the forward drive gear selector shaft.

Figure 2:
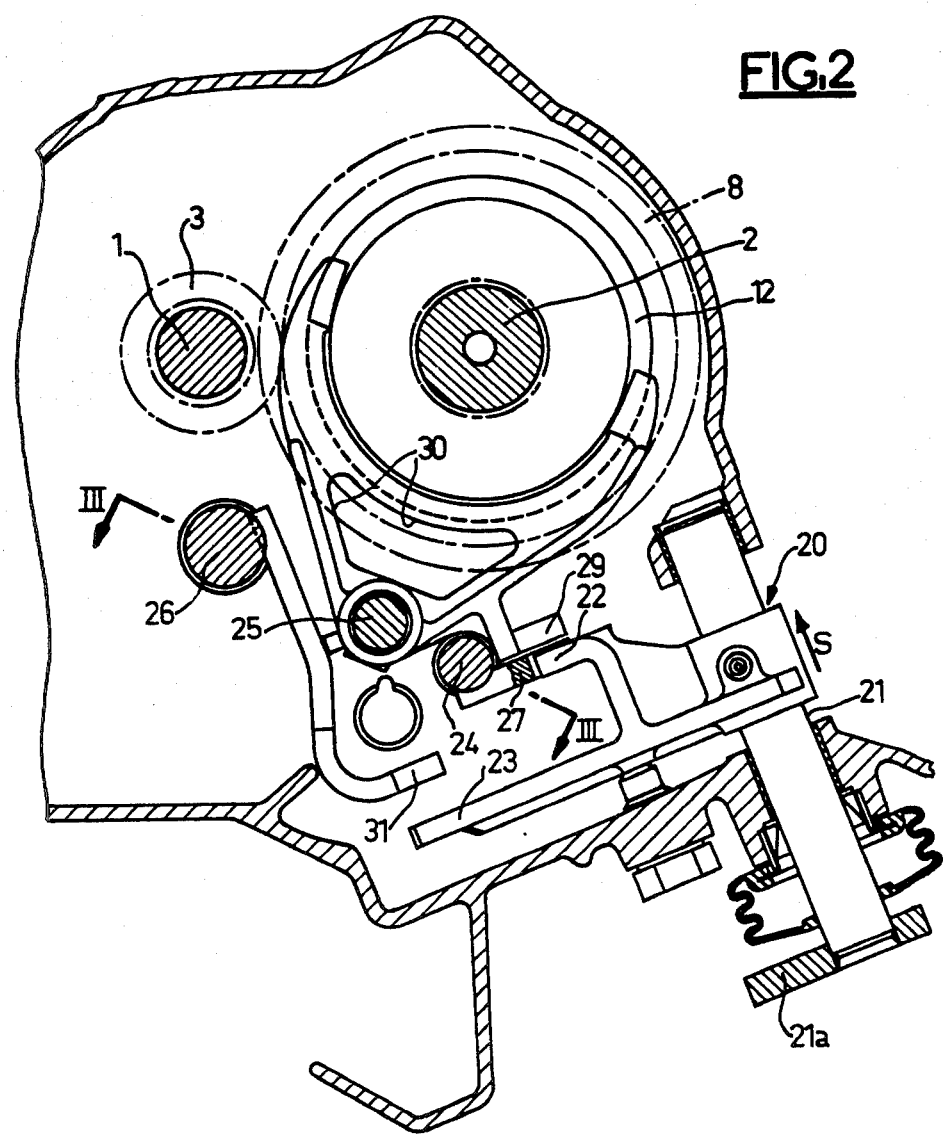
Figure 3:
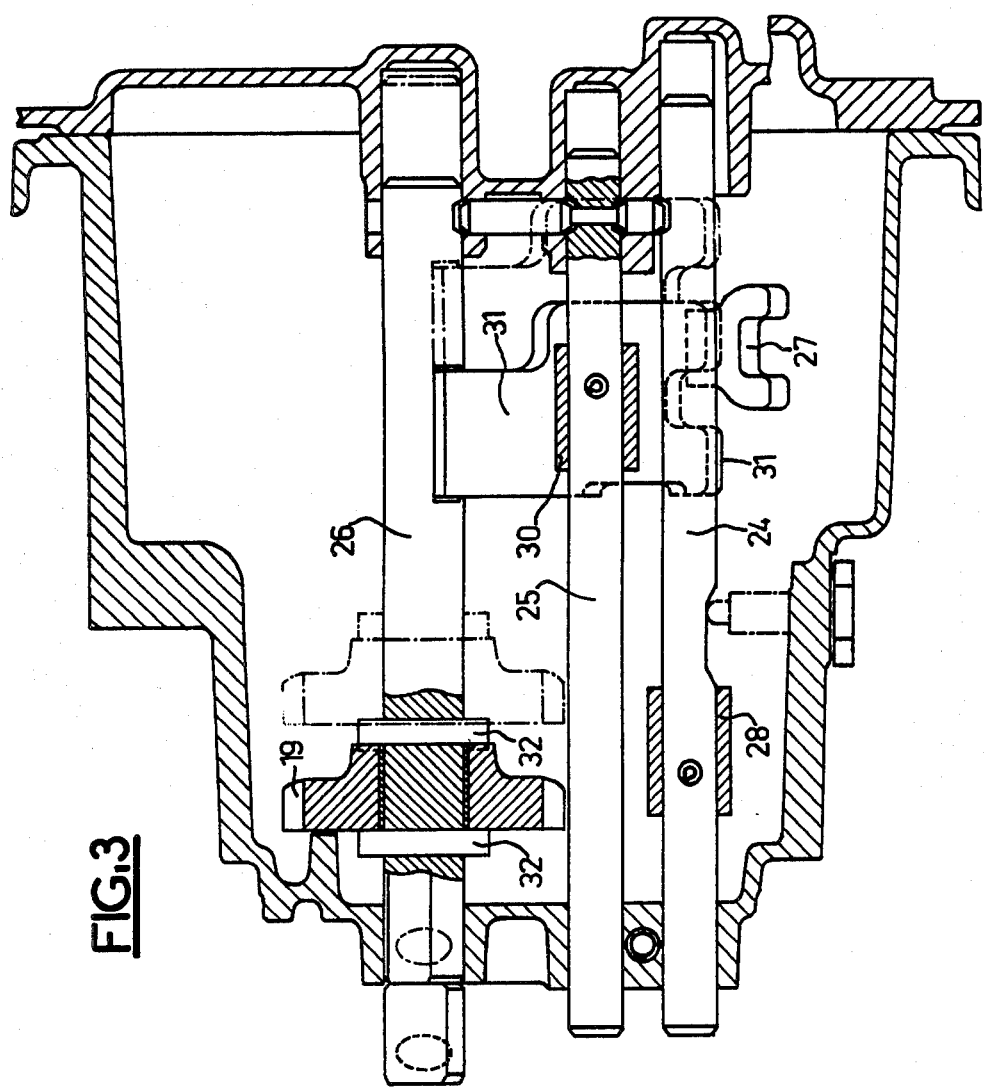

Furthermore an embodiment of the device according to the invention is described hereinafter as an example, with reference to the appended drawings, in which:

FIG. 1 is a part cross-section view of a gearbox with four forward speeds and one reverse gear;
FIG. 2 is a section view along II—II of FIG. 1;
FIG. 3 is a section view along III—III of FIG. 2;
FIG. 4 is a section view along IV—IV of FIG. 1.

The gearbox shown in FIG. 1 comprises an input shaft 1 and a parallel output shaft 2. The input shaft 1, the right-hand end of which is driven by the vehicle clutch, carries, integral with it, four forward drive gears 3, 4, 5, 6 and a reverse drive gear 7. The output shaft carries four gear wheels mounted loose on it and in permanent mesh with the forward drive gear wheels 3, 4, 5, 6. The forward drive ratios can be engaged selectively by means of sliding rings 12, 13 forming part of double synchronizers which may be of any type and engaging respectively with the dog clutches 14, 15 of gears 8, 9 and with the dog clutches 16, 17 of gears 10, 11 in order to couple them selectively with the output shaft 2. Purely for the record insofar as this example is concerned, shaft 2 here carries an output gear 2a intended to drive the ring gear of a transmission differential combined with the gearbox.

The sliding ring 13 is provided with a reverse drive transmission gear 18 which is located in the same plane as the drive gear 7 when the sliding ring is in the neutral position as shown in FIG. 1. Reverse drive is provided via a gear wheel 19 shown in FIGS. 3 and 4 and mounted to be movable in translation in such a way as to then come and mesh with gearwheels 7 and 18, the forward drive sliding rings being at the neutral point. The gearbox comprises a gear ratio selector and engagement element, labelled 20 overall, comprising a shaft 21 mounted with a sliding fit and rotating inside the gearbox casing and on which are mounted an operating lever 21a and a two-peg selector 22, 23 respectively intended to operate selector shafts 24, 25 controlling the forward gear ratios and a selector shaft 26 controlling the reverse drive, all mounted to be movable in translation inside the gearbox casing (see FIG. 3).

The gear ratio selector and engagement element is controlled in the ordinary way in this case, which is not shown as it can be of any type within the framework of the invention, i.e. it is subjected to translational control of its shaft 21 for selecting the selector shafts to be moved and to angular movement of this shaft 21 for engaging the selected ratio or disengaging it.

In particular here, peg 22 engages with a notched yoke 27 fixed to selector shaft 24 onto which a fork 28 is also pinned (see FIGS. 3 and 4) and engaged in the groove of sliding ring 13, or with a notched yoke 29 fitted on fork 30 controlling sliding ring 12, which is engaged in the groove of the latter and pinned onto selector shaft 25 (see FIG. 2). The peg 23 is designed to engage with a notched yoke 31 fixed to selector shaft 26 onto which the reverse drive gear 19 is fitted to be loose but fixed to it in translation between two pins 32.

In FIG. 2 the gear ratio selector and engagement element has been shown in a neutral control position for which peg 22 is normally engaged in the notched yoke 27 connected with the fork 28 controlling sliding ring 13 located at the neutral point.

By translation of shaft 21 of element 20 in the direction of the arrow S peg 22 can also be engaged in the notched yoke 29 of fork 30 controlling the sliding ring 12 located at the neutral point.

It is obvious that sliding ring 12 enables the first or second gear ratios to be engaged and sliding ring 13 enables the third or fourth gear ratios to be engaged; these engagements by translation of the sliding rings result from an angular movement through a given range of the peg 22, which is transmitted to it by rotation of shaft 21 of element 20.

Reverse drive is selected at the neutral point by a further translational travel of shaft 21 of element 20, which then brings peg 23 into engagement with notched yoke 31 fixed to selector shaft 26, and it can be engaged by an angular movement of this peg 23 which is transmitted to it by rotation of shaft 21 of element 20 and which, for rotation of equivalent range to that of the forward drive ratios, is manifested in roughly twice the translational travel of selector shaft 26 compared with the travel of selector shafts 24, 25. This travel enables reverse gear 19 to cover the clearance travel laid down by the position of gear 18 on sliding ring 13 (here there must be no engagement of pinions 18 and 19 when the sliding ring 13 comes and engages the dog clutch 17 of fourth speed gear 11) and then to cover its travel for effective engagement with gears 7 and 18.

Those skilled in the art will appreciate the simplicity of this type of reverse drive control and many variants can, of course, be thought up without stepping outside the area of the invention for all that.

I claim:
1. In a vehicle gearbox having:

(a) sliding rings movable axially for engaging forward ratios,
(b) an idler gear movable axially for engaging a reverse drive,
(c) forward selector shafts, each associated with one of said sliding rings and axially shiftable for moving said ring between an intermediate neutral position and end engagement positions,
(d) a reverse drive selector shaft axially shiftable for moving said idler gear between a rest position not in engagement and an active position in meshing engagement with first and second reverse gears,
(e) forward notched yokes, each fixed to one of said forward selector shafts for operating said shafts,
(f) a reverse drive notched yoke fixed to said reverse drive selector shaft,
(g) a gear ratio selector and engagement control element having a forward peg with a first end head engageable selectively in notches of said forward notched yokes, and a reverse drive peg with a second end head engageable selectively in a notch of said reverse drive notched yoke, said element being movable in rotation around an axis by a determined angular stroke from a neutral position for operating axially the selected notched yoke, the improvement wherein:
(h) said idler gear is rotatably mounted directly on said reverse drive selector shaft to be axially carried thereby,
(i) one of said first and second reverse gears is fixed to one of said sliding rings and is axially movable therewith, and
(j) said second end head of said reverse drive peg is substantially twice as distant from said axis of said control element as said first end head of said forward peg,
whereby said determined angular stroke causes an axial stroke of said reverse drive selector shaft, when selected, greater than the axial strokes of said forward selector shafts, when selected, to such an extent that said idler gear in said rest position cannot engage said one reverse gear fixed to said sliding ring when shifted in its engagement positions toward said rest position.

* * * * *